March 10, 1959 — H. F. STREIB — 2,876,964
CIRCULAR WING AIRCRAFT

Filed July 22, 1953 — 3 Sheets-Sheet 1

INVENTOR.
HOMER F. STREIB
BY
Knox & Knox
AGENTS FOR APPLICANT

March 10, 1959 — H. F. STREIB — 2,876,964
CIRCULAR WING AIRCRAFT
Filed July 22, 1953 — 3 Sheets-Sheet 2

INVENTOR.
HOMER F. STREIB
BY
Knox & Knox
AGENTS FOR APPLICANT

March 10, 1959 H. F. STREIB 2,876,964
CIRCULAR WING AIRCRAFT
Filed July 22, 1953 3 Sheets-Sheet 3

INVENTOR.
HOMER F. STREIB
BY
*Knox & Knox*
AGENTS FOR APPLICANT

United States Patent Office 2,876,964
Patented Mar. 10, 1959

2,876,964

CIRCULAR WING AIRCRAFT

Homer Frederick Streib, Chula Vista, Calif.

Application July 22, 1953, Serial No. 369,638

10 Claims. (Cl. 244—12)

The present invention relates generally to aircraft and more particularly to a circular wing aircraft capable of vertical and lateral flight.

The primary object of this invention is to provide a circular wing aircraft having a central impeller, which causes an influx of air radially across the wing so that lift is created without lateral translatory motion thus allowing the aircraft to rise vertically.

Another object of this invention is to provide a circular wing aircraft in which the air flow from the impeller may be alternatively directed to provide vertical or lateral propulsion.

Another object of this invention is to provide a circular wing aircraft in which the radial airflow may be proportionally controlled to govern the direction of flight.

Another object of this invention is to provide a circular wing aircraft which may be fitted with auxiliary propulsion means and may be controlled in a manner similar to a conventional aircraft.

Finally, it is an object to provide a circular wing aircraft of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Figure 1:
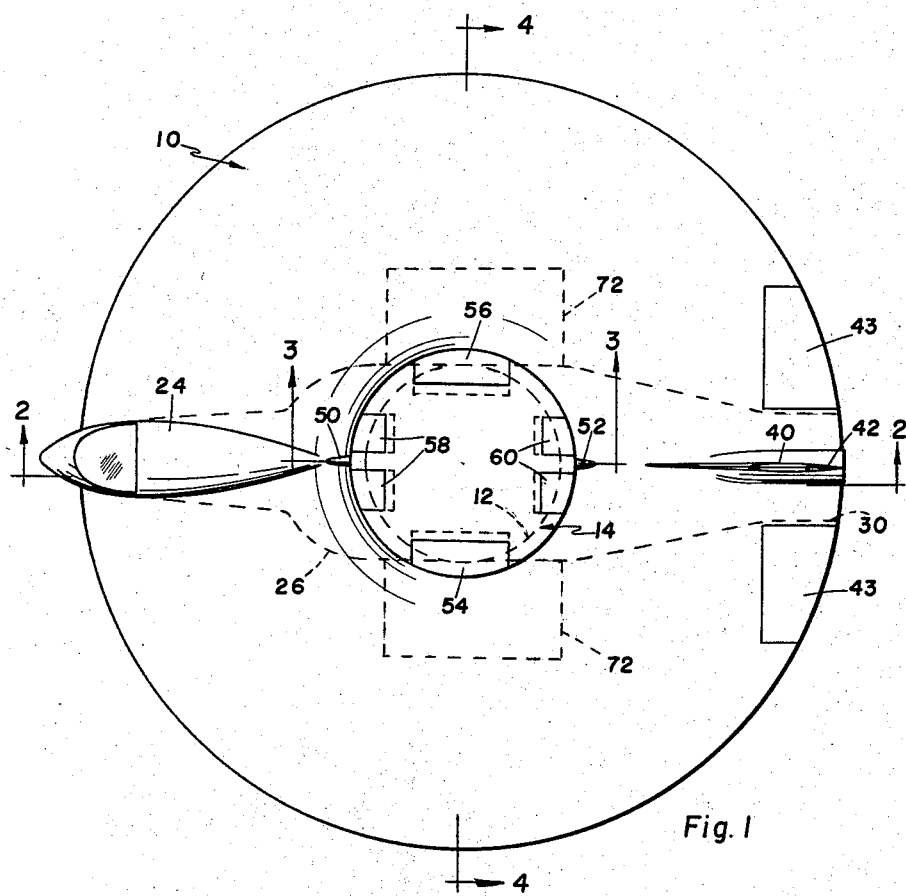
Fig. 1 is a plan view of the aircraft.
Figure 2:
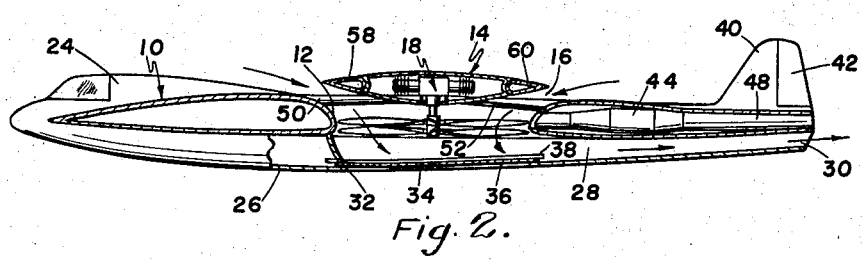
Fig. 2 is a sectional view taken on the line 2—2 of Fig. 1.
Figure 3:
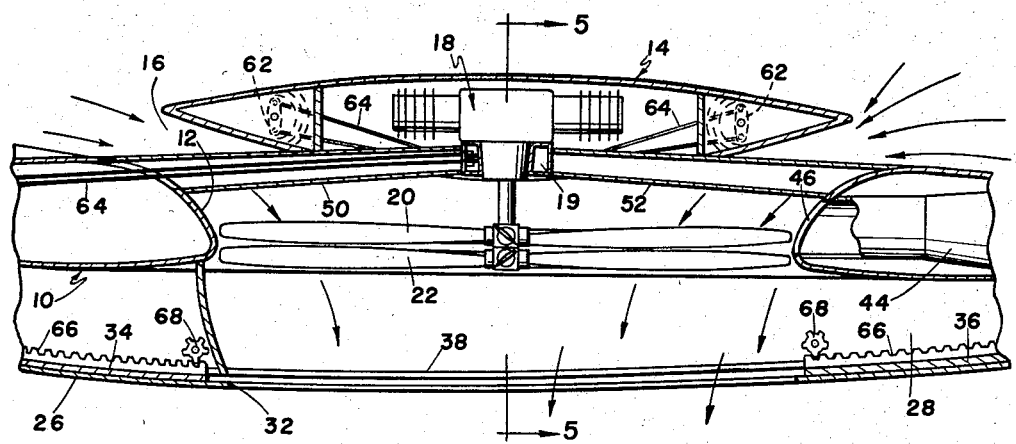
Fig. 3 is an enlarged fragmentary sectional view taken on the line 3—3 of Fig. 1.

Referring now to the drawings, the aircraft comprises a circular wing 10 having a large central opening 12, the airfoil section of the wing being substantially constant radially from said opening. Above the opening 12 is secured a baffle or cap 14 which is spaced from the wing 10 to provide an annular gap 16 therebetween, said cap being shaped so that the gap is substantially an annular venturi.

Within the cap 14 is an engine 18, a conventional internal combustion engine being shown although other types may be equally suitable. The engine 18 is secured to a mounting 19 and drives a pair of counter-rotating propellers 20 and 22, which are located directly in the opening 12 and are approximately equal in diameter to the diameter of said opening.

The aircraft is provided with a forward cabin 24 which is faired into the main fuselage 26, the fuselage containing a duct 28 which communicates with and extends from beneath the opening 12 to the rear of the wing 10, this duct terminating in an outlet 30. The fuselage 26 has an aperture 32 directly beneath the opening 12, said aperture being covered by a pair of sliding doors 34 and 36 which are mounted in tracks 38.

The aircraft has a fin 40 mounted on the rear upper surface of the wing 10 and the fin supports a rudder 42 to provide directional control in level flight. The wing is also fitted with conventional elevons 43 to provide longitudinal control.

Auxiliary power for level flight is provided by a turbo-jet engine 44, or the like, mounted in the airfoil beneath the fin 40, said jet engine having an inlet 46 through the airfoil from the opening 12 and a tail pipe 48 exhausting adjacent the outlet 30.

The cap 14 is supported on the wing 10 by streamlined struts 50 and 52 at the front and rear thereof, respectively. The cap 14 is provided with lateral control vanes 54 and 56 which are hinged in a manner similar to the control surfaces of a conventional aircraft. Also fitted to the cap are a pair of front control vanes 58 and a pair of rear control vanes 60 hinged in a similar manner as described above. All of these control vanes are provided with control horns 62 to which are connected control cables 64. These control cables are conducted to the cabin 24 through the front strut 50 and are connected to a conventional control column. The complete control system is installed according to conventional aircraft practice using standard equipment, the details of which are not considered essential to this disclosure.

The sliding doors 34 and 36 are actuated by a suitable mechanism such as the racks 66 secured to said doors, and the pinions 68 which are driven by means of motors 70, said doors opening to the front and rear, respectively.

The circular wing provides considerable internal space for items such as the fuel tanks 72, the remainder of the space being used for cargo or the like if required, while on large aircraft of this type the wing might contain passenger cabins.

The operation of the aircraft is relatively simple and in accordance with conventional aerodynamics. For takeoff, the sliding doors 34 and 36 are opened and the engine 18 is started. The propellers 20 and 22, which are counter-rotating to eliminate torque, draw air downwardly through the opening 12. This influx of air causes the surrounding air to flow radially inwardly over the entire wing 10 and pass through the annular gap 16. The air flow across the wing thus generates lift as is well known, and it has been found in practice that considerable static lift is obtained with a wing of this form. The air passes downwardly through the opening 12 and exhausts through the aperture 32, also contributing to the lift of the aircraft.

Figure 5:
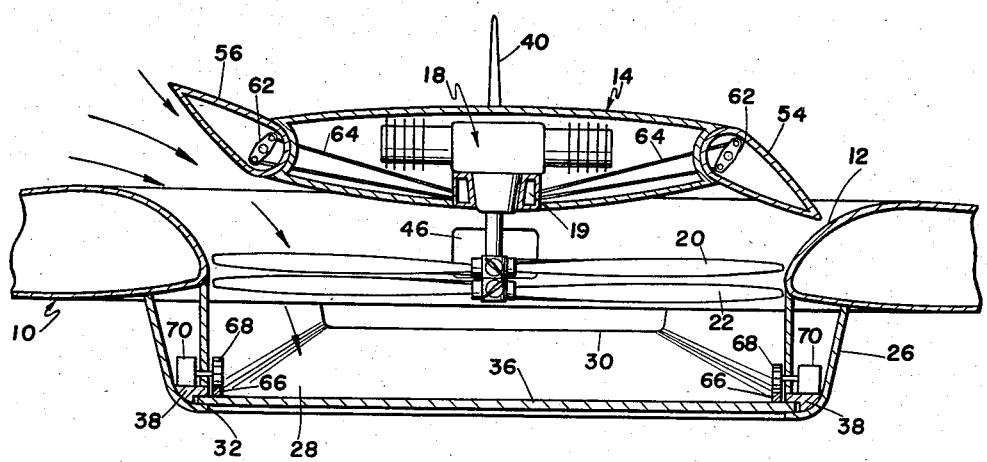
Fig. 5 is a sectional view taken on the line 5—5 of Fig. 3, but showing the spoilers in offset position.

The aircraft rises vertically as the thrust is increased, stability being maintained by use of the control vanes on the cap 14. The lateral control vanes 54 and 56 function in a manner similar to the ailerons of a conventional aircraft, that is, one control vane is raised as the other control vane is lowered by the necessary movement of the pilot's controls. In Fig. 5, the control vane 56 is shown raised while the control vane 54 is lowered and it will be seen that the control vane 54 effectively closes a portion of the annular gap 16. The airflow is thus interrupted on one side of the wing by closure of the control vane 54, while the airflow is increased on the other side of the wing by the opening of the control vane 56. The consequent unequal lift causes the aircraft to tilt or bank so that lateral stability can be maintained.

The front and rear control vanes 58 and 60 are actuated in a similar manner, that is, the front control vanes are lowered while the rear control vanes are raised or vice-versa. In this way the longitudinal stability of the aircraft may be maintained in vertical flight, the front and rear control vanes being connected in a manner similar to the elevators of a conventional aircraft.

As soon as the aircraft has reached the required altitude, the jet engine 44 is started to provide forward thrust. At the same time, the sliding doors 34 and 36 are closed so that the thrust from the propellers is now directed backwardly through the duct 28 to augment the forward thrust. In level flight, the lift is generated by the air stream moving from front to rear over the entire wing, the area of which is considerably greater than conventional aircraft of similar weight. The aircraft is, of course, controlled in the normal manner in level flight by means of the rudder 42 and the elevons 43. These elevons are actuated in a manner similar to the corresponding control surfaces on a flying wing type aircraft and perform the dual function of elevators and ailerons. In this form, the elevons may be raised or lowered together to cause the aircraft to climb or dive, respectively, and may also be actuated so that one elevon is raised while the other is lowered in order to bank or turn the aircraft. Various combinations of the movements of the aforementioned controls direct the aircraft through its various maneuvers.

Although counter-rotating propellers are shown, the aircraft may also be fitted with a single propeller together with means for counteracting torque. This latter arrangement is particularly suitable for small aircraft in which the weight and cost of the dual propeller installation may be prohibitive.

Figure 6:
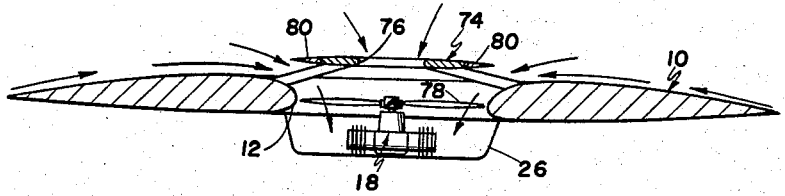
Figs. 6, 7 and 8 are diagrammatic sectional views similar to Fig. 4, showing alternative arrangements of the aircraft structure.

A slightly modified form of the aircraft is illustrated in Fig. 6 in which the cap 74 is provided with an aperture 76. The engine 18 is installed in the fuselage 26 which, together with the wing 10, is basically similar to the structure previously described. The propeller 78 is, of course, mounted in the opening 12 to draw air between the cap 74 and the wing 10, and also to draw additional air through the aperture 76 to provide increased thrust during vertical ascent. The cap 74 is fitted with control vanes 80 which operate in a similar manner to the control vanes described above.

Figure 7:
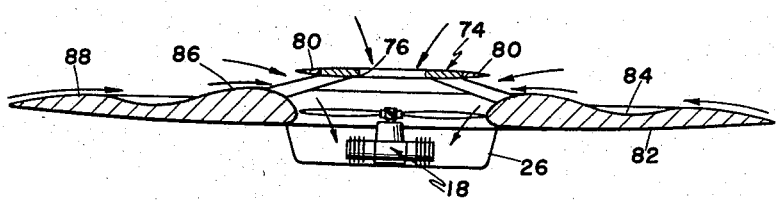

A further modification is shown in Fig. 7 in which the general structure is similar to that shown in Fig. 6, except that the airfoil of the wing 82 has an annular concavity 84 which substantially forms two concentric airfoils 86 and 88.

Figure 4:
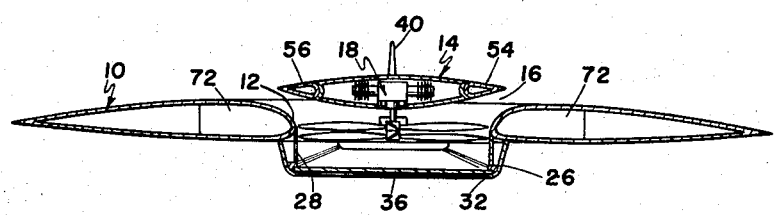
Fig. 4 is a sectional view taken on the line 4—4 of Fig. 1.
Figure 8:
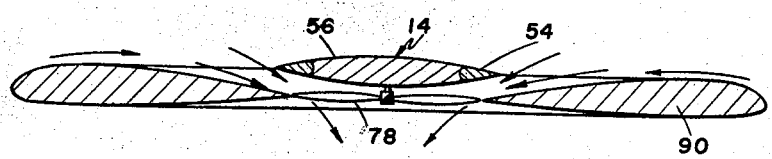

Yet another form of the aircraft is shown in Fig. 8, the arrangement being substantially similar to that shown in Fig. 4, except that the airfoil of the wing 90 is reversed so that the maximum thickness of the airfoil is adjacent the periphery rather than the center of the wing.

Throughout the various views of the drawings, the general direction of the airflow is indicated by arrows and it will be evident that all forms of the structure described amply achieve the required results.

It is understood that minor variation from the form of the invention disclosed herein may be made without departure from the spirit and scope of the invention, and that the specification and drawing are to be considered as merely illustrative rather than limiting.

I claim:

1. An aircraft having a circular wing with a central opening in said wing, the airfoil section of said wing being substantially symmetrical about a vertical axis through said opening, a cap supported substantially axially of said opening and spaced above the adjacent portions of said wing, said cap having control surfaces operatively mounted thereon, impelling means operatively mounted in said opening to draw air radially inwardly across said wing and downwardly through the opening.

2. An aircraft having a circular wing and a central opening in said wing, the airfoil section of said wing being substantially symmetrical about a vertical axis through said opening, a cap supported substantially above said opening and spaced above the adjacent portions of said wing to define an annular gap therebetween, said cap having control vanes mounted thereon, said control vanes being pivotal to restrict selected portions of said annular gap, and impelling means operatively mounted in said opening to draw air radially inwardly across said wing between said cap and the wing and to drive said air downwardly through said opening.

3. An aircraft having a circular wing and a central opening in said wing, the airfoil section of said wing being substantially symmetrical about a vertical axis through said opening, a cap supported substantially above said opening and spaced above the adjacent portions of said wing to define an annular gap therebetween, said cap having pairs of opposed control vanes pivoted thereon, said control vanes being operatively connected in pairs to move in opposite directions and to be pivoted selectively to restrict portions of said annular gap, and impelling means operatively mounted in said opening to draw air radially inwardly across said wing between said cap and the wing and to drive said air downwardly through said opening.

4. An aircraft having a circular wing and a central opening in said wing, the airfoil section of said wing being substantially symmetrical about a vertical axis through said opening, a cap supported substantially above said opening and spaced above the adjacent portions of said wing to define an annular gap therebetween, said cap having pairs of opposed control vanes pivoted thereon, said control vanes being operatively connected in pairs to move in opposite directions and to be pivoted selectively to restrict portions of said annular gap, impelling means operatively mounted in said opening to draw air radially inwardly across said wing between said cap and the wing and to drive air downwardly through said opening, a duct beneath said wing, said duct extending to the rear of the wing and having an outlet, an aperture in said duct directly beneath said opening, and means for closing said aperture.

5. An aircraft having a circular wing and a central opening in said wing, the airfoil section of said wing being substantially symmetrical about a vertical axis through said opening, a cap supported substantially above said opening and spaced above the adjacent portions of said wing to define an annular gap therebetween, said cap having pairs of opposed control vanes pivoted thereon, said control vanes being operatively connected in pairs to move in opposite directions and to be pivoted selectively to restrict portions of said annular gap, impelling means operatively mounted in said opening to draw air radially inwardly across said wing between said cap and the wing and to drive air downwardly through said opening, a duct beneath said wing, said duct extending to the rear of the wing and having an outlet, an aperture in said duct directly beneath said opening, and sliding doors operatively mounted on said wing in said duct whereby said aperture may be selectively closed.

6. An aircraft having a circular wing and a central opening in said wing, the airfoil section of said wing being substantially symmetrical about a vertical axis through said opening, a cap supported substantially above said opening and spaced above the adjacent portions of said wing to define an annular gap therebetween, said cap having pairs of opposed control vanes pivoted thereon, said control vanes being operatively connected in pairs to move in opposite directions and to be pivoted selectively to restrict portions of said annular gap, an engine in said cap, propeller means operatively connected to said engine, said propeller means being disposed to draw air radially inwardly across said wing, between said cap and the wing and downwardly through said opening.

7. An aircraft having a circular wing and a central opening in said wing, the airfoil section of said wing being substantially constant radially of said opening, a cap supported above said opening and spaced from said wing to define an annular gap therebetween, said cap having opposed control vanes pivoted thereon, said control vanes being operatively connected to be pivoted selectively to restrict portions of said annular gap, a cabin at the front of said wing, a fuselage extending from said cabin to the rear of said wing, a duct in said fuselage, said duct having an aperture beneath said opening and slidable doors for closing said aperture, driven propeller means mounted on said wing and disposed in said opening to draw air radially inwardly across said wing and downwardly through said opening.

8. An aircraft according to claim 3 wherein said cap has a central aperture substantially coaxial with said opening in the wing.

9. An aircraft according to claim 3 wherein said wing has an annular concavity in the upper surface thereof, whereby the effect of dual concentric airfoils is obtained.

10. An aircraft according to claim 3 wherein the maximum thickness of said wing is adjacent to the outer periphery thereof.

References Cited in the file of this patent

UNITED STATES PATENTS

| | | |
|---|---|---|
| 1,123,589 | Porter | Jan. 5, 1915 |
| 2,468,787 | Sharpe | May 3, 1949 |
| 2,547,266 | Hoglin | Apr. 3, 1951 |
| 2,567,392 | Naught | Sept. 11, 1951 |

FOREIGN PATENTS

| | | |
|---|---|---|
| 129,142 | Great Britain | July 10, 1919 |
| 339,462 | Italy | Apr. 22, 1936 |